(12) United States Patent
Wojsznis et al.

(10) Patent No.: US 6,970,750 B2
(45) Date of Patent: Nov. 29, 2005

(54) MODEL-FREE ADAPTATION OF A PROCESS CONTROLLER

(75) Inventors: Wilhelm K. Wojsznis, Round Rock, TX (US); Terrence L. Blevins, Round Rock, TX (US); Dirk Thiele, Austin, TX (US); John A. Gudaz, Bel Air, MD (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 538 days.

(21) Appl. No.: 10/126,768

(22) Filed: Apr. 19, 2002

(65) Prior Publication Data

US 2003/0067355 A1 Apr. 10, 2003

Related U.S. Application Data

(60) Provisional application No. 60/305,545, filed on Jul. 13, 2001.

(51) Int. Cl.[7] ............................................... G05B 13/02
(52) U.S. Cl. .............................. 700/28; 700/48; 700/40; 700/52; 700/55; 700/37; 700/41; 700/42; 700/43; 700/39; 700/47; 700/49; 700/50; 700/54; 700/71; 700/72; 700/75; 700/76; 700/77; 706/14; 706/23; 706/16; 706/25
(58) Field of Search ............................... 700/40, 41–43, 700/28, 48, 39, 52, 54–55, 47–50, 71–72, 75–77; 706/14, 23, 16, 25

(56) References Cited

U.S. PATENT DOCUMENTS

| | | | |
|---|---|---|---|
| 3,798,426 A | 3/1974 | Bristol, II | ................ 235/151.1 |
| 5,170,341 A | 12/1992 | Sklaroff | ....................... 364/162 |
| 5,355,305 A | 10/1994 | Seem et al. | .................. 364/161 |
| 5,481,453 A | 1/1996 | Desantis | |
| 5,748,467 A | 5/1998 | Qin et al. | .................... 364/148 |
| 5,818,714 A | * 10/1998 | Zou et al. | ..................... 700/37 |
| 6,081,751 A | * 6/2000 | Luo et al. | ..................... 700/42 |
| 6,142,078 A | * 11/2000 | Lachajewski | ............... 101/484 |
| 6,360,131 B1 | * 3/2002 | Cheng | ......................... 700/40 |
| 6,684,112 B1 | * 1/2004 | Cheng | ......................... 700/28 |
| 6,684,115 B1 | * 1/2004 | Cheng | ......................... 700/45 |

OTHER PUBLICATIONS

Hao Ying, William Siler, and James Buckley, "Fuzzy Control Theory: A Nonlinear Case," Automatica, vol. 26, No. 3, 1990.

(Continued)

*Primary Examiner*—Anthony Knight
*Assistant Examiner*—Thomas Pham
(74) *Attorney, Agent, or Firm*—Marshall, Gerstein & Borun LLP

(57) ABSTRACT

An adaptive process controller drives a process variable to be substantially equivalent to a set point and adapts the controller gain, the controller reset, and/or the controller rate, based on model free adaptation. The adaptive controller combines a controller gain computed from an oscillation index with a controller gain computed from a steady state estimate and that adapts the controller reset/rate by forcing the ratio of two of the controller proportional, integral or derivative terms to be equal to a predetermined value.

50 Claims, 6 Drawing Sheets

OTHER PUBLICATIONS

Cheng Ling, and Thomas F. Edgar, "A New Fuzzy Gain Scheduling Algorithm for Process Control," Proc Of ACC'92, pp. 2284–2290, Chicago, Jun. 1992.

S. Joe Qin, "Auto–tuned Fuzzy Logic Control," Proc. Of ACC'94, pp. 2465–2469, Baltimore, Jul. 1994.

K.J. Astrom, and T. Hagglund, "PID Controllers: Theory, Design, and Tuning", Chapter 6.6 ISA 1995.

J. Maršik, and V. Strejc, "Application of Identification–free Algorthims for Adaptive Control," Automatica, vol. 25, No. 2, pp. 273–277, 1989.

Petr Klán, and Jaroslav Maršik, "Implementation and Application of Single–Board Microcomputer–based Simple Auto– Tuners," IFAC Workshop, Tbilisi, Georgia, 1989.

J. Maršik, P. Klán, V. Görner, "Signal–based Algorithms for Self–tuning Regulators Easily Implementable on Signal–Board Microcomputers," Advanced Methods in Adaptive Control for Industrial Applications, May 31, 1991.

Jaroslav Maršik, Petr Klán, "A Nonlinear Adaptive PID Controller," IFIP Conference on Optimized–Based Computer–Aided Modeling and Design, Prague, Czech Republic, May 1994.

Michael G. Ott and Willy K. Wojsznis, "Auto–tuning: From Ziegler–Nichols to Model Based Rules," Proceedings of the ISA/95 Conference, pp 323–332, New Orleans, 1995.

Jin Zhang and Dale E. Seborg "Adaptive Controller Tuning Project, Report #1," University of California, Santa Barbara, CA, Nov. 2000.

Wojsznis et al., "Adaptive Model Free PID Controller," Fifth SIAM Conference on Control & Its Applications, Jul. 11–14, San Diego, CA, pp E–1—E–27, Jul. 2001.

* cited by examiner

MODEL-FREE ADAPTATION OF A PROCESS CONTROLLER

RELATED APPLICATION

This application claims the benefit of U.S. Provisional Application No. 60/305,545, filed Jul. 13, 2001.

TECHNICAL FIELD

The present invention relates generally to adaptation of process controllers and more particularly to model-free adaptation of process controllers, such as PID controllers and fuzzy logic controllers in response to, for example, load disturbances or set point changes.

BACKGROUND ART

It is known to use a process controller, such as a proportional-integral (PI) controller, a proportional-integral-derivative (PID) controller or a fuzzy logic controller (FLC), to control a process so as to keep a process variable equivalent to a desired set point value. Such process controllers typically use a set of control parameters such as controller gain, controller integral time (called reset) and derivative time (called rate) which have been developed in a desired manner to control the process variable. As the process operates, however, it is typically useful and sometimes necessary to adapt the control parameters to adjust for changes in the process or set points, or to optimize the controller based upon observed operational parameters.

A model free adaptive process controller utilizes a typical closed-loop controller response to adapt and respond to set point changes or load disturbances. In one example of a model free adaptive process controller, the system measures the period of oscillation and detects the actual damping and overshoot of the error signal. If there are no oscillations in the error signal, the proportional gain control parameter is increased and the integral and derivative time control parameters are decreased. If oscillation in the error signal is detected, the damping and the overshoot of the oscillation is measured and the gain, controller integral time, and derivative time control parameters are adjusted accordingly.

While this example of a model free adaptive approach is simple, it has demonstrated some deficiencies. Specifically, this approach is only applicable when the control response is oscillatory. If the control response is not oscillatory, the control parameters or set point must be changed to induce oscillation and force adaptation. As a result, the adaptation requires more than one set point change to tune an overdamped controller and, furthermore, the controller is limited in that it is tuned for an oscillatory response with a relatively small margin of safety.

Recognizing that model free adaptive controllers have the potential of performing fewer calculations and requiring simpler algorithms than typical model-based adaptative controllers, there have been some attempts to overcome the above recognized deficiencies using model free adaptive controllers. For example, Maršik, J. and Strejc, V., "Application of Identification-Free Algorithms for Adaptive Control," Automatica, vol. 25, No. 2, pp. 273–277, 1989, discloses an exemplary model free adaptive PID controller. In this article, Maršik and Strejc recognized that, in a properly tuned controller, the mean absolute values of all the controller proportional, integral, and derivative terms constituting the controller change of output are roughly equal. As a result, this article describes an adaptive routine that tunes a process controller by forcing the control parameters to values that cause the mean absolute values of all of the individual proportional, integral, or derivative terms to be equal.

Unfortunately, the model-free adaptation controller proposed by Maršik and Strejc demonstrates poor convergence, sometimes passes through regions of instability, and does not appear to be valid for most process control problems. Furthermore, the adaptive routine proposed by Maršik and Strejc does not suggest applicability to non-linear controllers, such as fuzzy logic controllers.

Specifically, despite a number of publications in the recent decade illustrating advantages of fuzzy logic controllers, the proliferation of these controllers into the industry has been very slight. One reason for the relatively low incidence of the use of fuzzy logic controllers is the difficulty in tuning them. While a significant effort has been concentrated on tuning simple fuzzy logic controllers, wherein the controller defines two or three membership functions on the input and a similar amount of membership functions on the output, there has been no suggestion of applying model free adaptation approaches to fuzzy logic controllers.

SUMMARY

A model free adaptive controller is described herein which reduces some of the deficiencies of prior model free adaptive controller systems. For example, the described system demonstrates better convergence in the controller parameters being adapted, reduces interaction between the gain and the reset adaptation, allows for flexibility in meeting controller tuning requirements, reduces the effect of noise on gain adaptation, and works in closed-loop systems with either small or large dead times, as well as loops with variable dead time. Furthermore, the described system reduces the difficultly often associated with tuning fuzzy logic controllers.

DETAILED DESCRIPTION

Figure 1:
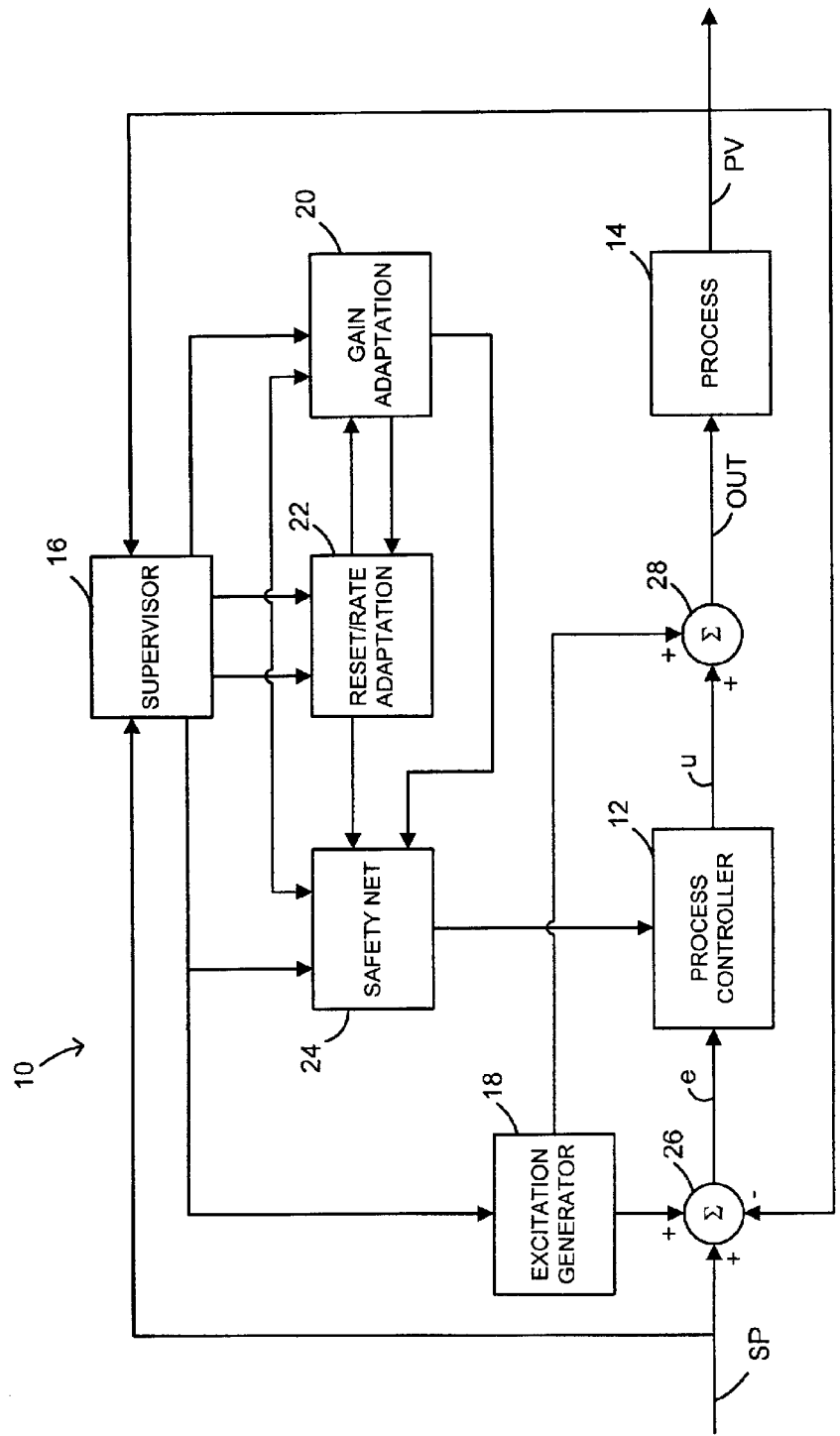
FIG. 1 is a block diagram of a model-free adaptive PID process control system.

FIG. 1 illustrates a block diagram schematic of an adaptive PID control system or tuner, which is designated generally by the reference character 10. The adaptive PID control system 10 includes a process controller 12, a process 14, a supervisor 16, an excitation generator 18, a gain adaptation block 20, a reset/rate adaptation block 22, and a safety net block 24 communicatively connected as illustrated in FIG. 1. In accordance with standard closed-loop control system operations, a process output signal or process variable PV is sensed from the process 14 and is applied to a summing block 26 for comparison with a set point SP. An output signal from the excitation generator 18 may also be applied to the summing block 26 as described in detail below. An error signal determined as the difference between the process variable PV and the set point SP is delivered to the process controller 12, which in this example may be any type of PID controller or one of its variants.

In closed-loop operation, the output of the process controller 12 is applied to a summing block 28, where it may be summed with an output signal from the excitation generator 18, and the output of the block 28 is applied as a control signal OUT to the process 14. In this manner, in accordance with standard closed-loop control principles, the process controller 12 operates to drive process variable PV to be substantially equal to set point SP based upon the following general equation:

$$u(k) = K_c(k)\left[e(k) + \sum_k \frac{T_s}{T_i(k)}e(k) + \frac{T_d(k)}{T_s}\Delta e(k)\right] \quad (1)$$

wherein:
- u(k)=the control signal OUT at time k;
- $K_c(k)$=the controller gain at time k;
- e(k)=the error signal, the difference between the set point SP and the process variable PV, at time k;
- $T_s$=the scan time interval;
- $T_i(k)$=the reset, or the controller integral time at time k;
- $T_d(k)$=the rate, or the controller derivative time at time k; and
- $\Delta e(k)$=the change in the error signal at time k; or e(k)−e(k−1).

An equivalent PID controller can be represented in an incremental form as:

$$\Delta u(k) = K_c(k)\left[\Delta e(k) + \frac{T_s}{T_i(k)}e(k) + \frac{T_d(k)}{T_s}\Delta^2 e(k)\right] \quad (2)$$

wherein:
- $\Delta^2 e(k) = \Delta e(k) - \Delta e(k-1)$; the change of the change in error signal at time k In general, the adaptive PID control system 10 adapts the controller gain $K_c$, as well as one or more of the controller parameters (i.e., the controller integral time and derivative time of equation (1)). To adapt the controller gain $K_c$, the gain adaptation block 20 combines a controller gain computed from an oscillation index $K_c^{OSC}$ and a controller gain computed from an estimate of the process steady state gain $K_c^{SS}$ to determine the overall controller gain $K_c$, thereby creating a controller system that is less susceptible to noise. To adapt the terms constituting the controller change of output as in equation (2), the reset/rate adaptation block 22 adapts certain controller parameters such as reset or rate to force the ratio of two or more of the controller terms to be equal to a predetermined constant.

In operation, the supervisor 16 monitors the set point SP and the process variable PV and begins adaptation under one or more predetermined conditions. For example, the supervisor 16 may begin adaptation when the error signal e or the change in the error signal Δe is greater than a predetermined threshold, i.e., when either or both of the following two conditions is satisfied:

$$|e(k)|>E_{min} \quad (3)$$

or $$|\Delta e(k)|>\Delta E_{min} \quad (4)$$

wherein:
- $E_{min}$=a predetermined minimum error signal threshold; and
- $\Delta E_{min}$=a predetermined minimum change in the error signal threshold.

The excitation generator 18 may be programmed to automatically cause an adaptation at specific times, to cause adaptations to occur at periodic times or to occur when the system has operated at a steady state for a predetermined amount of time. To cause adaptation of the adaptive PID control system 10, the excitation generator 18 may either automatically or under control of the supervisor 16 inject a control signal to one or both of the summing block 26 and the summing block 28, sufficient to force the signals in the system to meet one or more of the above-mentioned predetermined conditions and thereby trigger an adaptation procedure.

Once the supervisor 16 determines that adaptation is required, the supervisor 16 notifies the gain adaptation block 20 to begin the adaptation of the controller gain $K_c$. The gain adaptation block 20 performs adaptation by computing the controller gain $K_c$ as a weighted average of a gain computed from the oscillation index and of a controller gain computed from an estimate of the process steady state gain. For instance, the controller gain $K_c$ may be estimated according to the equation:
wherein:

$$K_c = \alpha_1 K_c^{SS} + (1-\alpha_1)K_c^{OSC} \quad (5)$$

- $\alpha_1$=a preset ratio constant which may be, for example, 0.4;
- $K_c^{SS}$=controller gain computed from an estimate of the process steady state gain; and
- $K_c^{OSC}$=controller gain computed from the oscillation index.

In particular, the gain adaptation block 20 may calculate the steady state controller gain $K_c^{SS}$ by using the process output ($PV^0$) and the controller output ($OUT^0$) before the set point change and at some time after the set point change, when the process output ($PV^1$) and controller output ($OUT^1$) come to a new steady state. This calculation may be performed according to the following equation:

$$K_c^{SS} = \frac{|OUT^0 - OUT^1|}{|PV^0 - PV^1|\lambda\left(1 + \frac{DT}{T_i(k)}\right)} \quad (6)$$

wherein:
- λ=a known lambda controller tuning factor used in closed loop controller tuning;
- DT=process dead time, which is either known or can be estimated by one of the known techniques; and
- $T_i(k)$=the controller reset at time k.

The above equation (5) may be rewritten as:

$$K_c^{SS} = \frac{1}{K^{SS}\lambda\left(1 + \frac{DT}{T_i(k)}\right)} \quad (7)$$

since $K^{SS}$ may be otherwise defined as the change in the process output (PV) over the change in the controller output (OUT).

Furthermore, the controller gain $K_c^{OSC}$ computed from the oscillation index may be calculated as:

$$K_c^{OSC} = K_c^{OSC}(k) + \Delta K_c^{OSC}(k) \quad (8)$$

wherein:
$K_c^{OSC}(k)$=controller gain computed from the oscillation index at time k; and
$\Delta K_c^{OSC}(k)$=the change in the controller gain computed from the oscillation index at time k.

The initial value of the controller $K_c^{OSC}$ gain computed from the oscillation index, may be calculated by using known PID controller tuning methods. For example, the initial value $K_c^{OSC}$ may be calculated using a relay oscillation auto tuner or manual loop step test.

Furthermore, the change in the controller gain $\Delta K_c^{OSC}$ computed from the oscillation index W(k) at time k may be calculated as:

$$\Delta K_c^{OSC}(k) = \chi K_c^{OSC}(k)(W(k) + W_{ref}) \quad (9)$$

wherein:
$\chi$=a preset constant controlling the speed of gain adaptation which may be, for example, between the values of 0.02 and 0.05;
$W_{ref}$=a preset value chosen from the interval −1 to +1 which may be, for example, −0.5;
and $$W(k) = sign[e(k)]sign[e(k) - 2e(k-2) + e(k-4)] \quad (10)$$

Therefore, in order for the gain adaptation block 20 to begin adapting the controller gain $K_c$, four scans must have occurred because the oscillation index requires the controller error signal at time k−4. Moreover, while the above calculation relies upon k−2 and k−4, any number of intervals may be utilized, including for example, k−6, k−8, etcetera.

Additionally, noise is commonly present in any process control system. Therefore, it is desirable to provide noise compensation in the adaptation process to reduce the effects of noise. For instance, the gain adaptation block 20 may account for noise in the adaptive PID control system 10 by increasing the preset value $W_{ref}$ by a statistically determined value according to the following equation:

$$W_{ref}^{noise} = W_{ref} + \phi\sigma \quad (11)$$

wherein:
$W_{ref}^{noise}$=the modified preset value $W_{ref}$, to account for noise;
$\phi$=a preset value defining the degree of noise compensation which may be, for example, between 1 and 4; and
$\sigma$=a capability standard deviation which is a known feature of any modern PID controller and reflects noise and higher frequency changes on the process output that cannot be corrected by the controller.

As a result of the noise compensation, the adaptive PID control system 10 demonstrates a lesser susceptibility to noise in the system.

As was stated above, the oscillation index $K_c^{OSC}$ is sensitive to noise and may be compensated according to equation (9). An alternative way of calculating the oscillation index $K_c^{OSC}$ to make it less susceptible to noise is to calculate the oscillation index as:

$$W(k) = sign[e(k)]sign[e(k) - 2e(k-i) + e(k-2i)] \quad (12)$$

wherein:
$i = int((k-k_0)/2)$; and
$k_0$=the time at which adaptation starts.

Alternatively, the calculation of the oscillation index $K_c^{OSC}$ to make it less susceptible to noise may be written as:

$$W(k) = sign[e(k)]sign\left[\frac{e(k) + e(k-2i)}{2} - e(k-i)\right] \quad (13)$$

Therefore, by utilizing the above equations, the oscillation index may be calculated even if the process variable PV crosses the set-point SP as long as the direction of the change in the process variable PV remains positive or negative. As soon as the change in process variable PV changes direction, another cycle of oscillation index calculations must be performed.

Upon completion of gain adaptation or concurrently with gain adaptation, the supervisor 16 directs the reset/rate adaptation block 22 to begin adaptation of one or more controller parameters which affect the proportional, integral and derivative controller terms as described below. In particular, the reset/rate adaptation block 22 adapts the controller integral time and or the derivative time to force two of the controller terms to a preset ratio. While the ratio may be one, in which case the two terms are equal, the ratio may be other than one. Also, while the adaptive PID control system 10 of FIG. 1 as described below adapts the controller integral time $T_i$ to cause the ratio of the proportional and integral controller terms to be equal to a preset ratio, it will be understood by those skilled in the art that the reset/rate adaptation block 22 may be programmed to adapt any combination of the controller terms to one or more ratios. For example, the adaptive PID control system 10 could adapt the derivative time $T_d$ to force the ratio of the proportional and derivative controller terms to a particular value.

In one embodiment, the reset/rate adaptation block 22, or the supervisor 16, first determines if the following equation is satisfied:

$$e(k) * \Delta e(k) < 0 \quad (14)$$

wherein:
e(k)=the error signal, the difference between the set point SP and the process variable PV, at time k; and
$\Delta e(k)$=the change in the error signal at time k.

If the above equation is satisfied, meaning the absolute value of the error signal is decreasing, the reset/rate adaptation block 22 may begin to adapt the controller reset $T_i$ to compensate for gain changes according to the following equations:

$$T_i(k+1) = T_i(k) + \Delta T_i(k) \quad (15)$$

wherein:
$T_i(k+1)$ the controller integral time at time k+1;
$T_i(k)$=the controller integral time at time k;
$\Delta T_i(k)$=the change in the controller integral time or the controller reset at time k;

where $$\Delta T_i(k) = \gamma T_i(k)\left(\frac{1}{\beta} - 1\right) \quad (16)$$

wherein:
γ=a preset constant controlling the speed of reset adaptation which may be, for example, between 0.05 and 0.5; and $$\beta = \frac{|\sum \Delta P_k|}{\alpha|\sum \Delta I_k|} = \frac{|\sum \Delta e(k)|T_i(k)}{\alpha|\sum e(k)|T_s} \quad (17)$$

wherein:
γ$P_k$=the change in the controller proportional term at time k;
Δ$I_k$=the change in the controller controller integral time at time k; and
α=a preset ratio.

During reset/rate adaptation, the goal is to adapt the controller integral time $T_i(k)$ to drive β equal to one, which occurs when the actual ratio of changes of the integral and proportional terms equal the desired ratio α. Thus, as mentioned above, the controller integral time $T_i$ will converge to a value dependent upon the chosen value of α. The value for α may be chosen by the relationship with λ, used in lambda-tuning, technique for calculating controller gain. The following relationship has been developed for model-free adaptation:
if αλ=1 then, $T_i(k)$ converges to a zero-pole cancellation value;
if αλ>1 then, $T_i(k)$ converges to larger than a zero-pole cancellation value; and
if αλ<1 then, $T_i(k)$ converges to smaller than a zero-pole cancellation value.

To further clarify this relationship, a tuning factor Λ which defines the value of the adaptive PID controller integral time in the same manner as λ in lambda-tuning defines the controller gain may be calculated as:

Λ=1/α.

the controller integral time at time k Ti(k) will converge to the value dependent on αλ according to the following known relationships:
if Λ=λ then, $T_i(k)$ converges to a zero-pole cancellation value;
if Λ<λ then, $T_i(k)$ converges to larger than a zero-pole cancellation value; and
if Λ>λ then, $T_i(k)$ converges to smaller than a zero-pole cancellation value.

The reset/rate adaptation block 22 may also include a check to compensate for the interaction between the controller gain $K_c$ and the controller integral time $T_i$. First, the reset/rate adaptation block 22 may perform the following test to determine if the compensation should occur:

$$\Delta T_i(k)*\Delta K_c(k) > 0 \quad (18)$$

wherein:
Δ$T_i(k)$=the change in the controller integral time at time k; and
Δ$K_c(k)$=the change in the controller gain at time k.

If the reset/rate adaptation block 22 determines that the interaction between the controller gain and the reset adaptation should be compensated, i.e., that the controller integral time $T_i$ and the controller gain $K_c$ are both changing positively or negatively, the following equations may be used to compensate or correct the controller integral time $T_i$ value:

$$T_i(k+1)_{corr} = T_i(k+1) + \Delta T_i(k)_{corr} \quad (19)$$

wherein:
$T_i(k+1)_{corr}$=the compensated controller integral time at time k+1;
$T_i(k+1)$=the uncompensated controller integral time at time k+1; and
Δ$T_i(k)_{corr}$=a compensated change in the controller integral time at time k.

Δ$T_i(k)_{corr}$ may be, for example, calculated as:

$$\Delta T_i(k)_{corr} = \Delta T_i(k)\left(1 - \kappa \frac{|\Delta K_c(k)|}{K_c(k)_{old}}\right) \quad (20)$$

wherein:
Δ$T_i(k)$=the change in the controller integral time at time k;
Δ$K_c(k)$=the change in the controller gain at time k;
$K_c(k)_{old}$=the controller gain at time k before the adaptive calculations; and
κ=a preset value representing the degree of reset compensation which may be, for example, 0.1.

To prevent oscillation of the process variable PV, the adaptive PID control system 10 may be equipped with the safety net 24. If, during adaptation, the supervisor 16 detects that the control response is oscillatory which can be detected when the process variable, and thus the error value, crosses the zero point, i.e., when the following equation is satisfied, $$e(k)*e(k-1)<0 \quad (21)$$

the supervisor 16 may activate the safety net 24 to reduce the controller gain $K_c$. To effect the reduction in the controller gain, the safety net 24 may utilize the following equation:

$$K_c(k+1) = \eta K_c(k) \quad (22)$$

wherein:
η=a preset proportional constant which may be, for example, 0.95; and
$K_c(k)$=The controller gain at time k.

Figure 2:
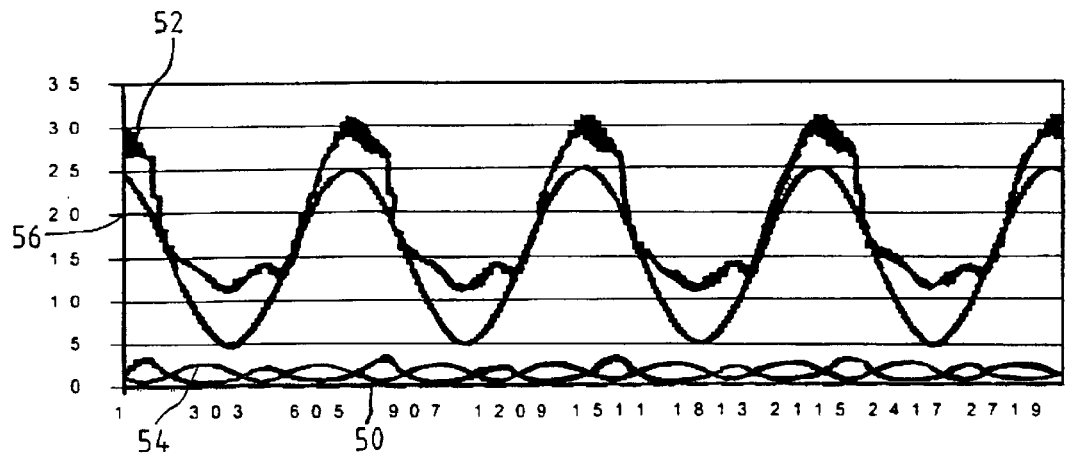
FIG. 2 is a graph plotting controller gain and reset adaptation, in response to changing process parameters in the system of FIG. 1.

FIG. 2 illustrates a graph plotting both the controller gain $K_c$, marked by reference 50, and controller integral time $T_i$, marked by reference 52, versus time, wherein the controller gain $K_c$ and the controller integral time $T_i$ were adapted in a simulated process control system as described above in response to changes in the process gain characteristic, denoted by line 54 and the process lag characteristic, denoted by line 56. Specifically, the process gain 54 varied in time k as 1.5+sin(k/7200) and the procress lag 56 varied in time k as 10+10 sin(k/14400). The process dead time was approximated as 2 seconds, the set point changed every 240 seconds, the plot sampling rate was 20 seconds, and the ratio a was chosen to be 1.6. As the graph of FIG. 2 shows, as the controller gain $K_c$ and the controller integral time $T_i$ adapted to the changing controller conditions, the controller gain $K_c$ (line 50) responded inversely to the change in the process gain 54 while the controller integral time $T_i$ (line 52) exhibited good tracking with the changing progress lag 56.

Figure 3:
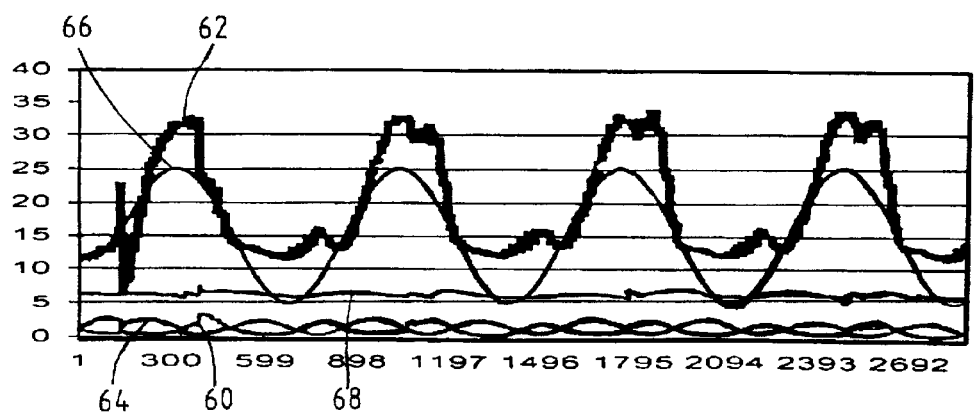
FIG. 3 is a graph plotting controller gain and reset adaptation, in response to changing process parameters in the presence of noise in the system of FIG. 1.

FIG. 3 illustrates a graph plotting both the controller gain $K_c$, marked by reference 60, and the controller integral time $T_i$, marked by reference 62, versus time, wherein the controller gain $K_c$ and the controller integral time $T_i$ were adapted in a simulated process control system as described above in response to changes in the process gain characteristic, denoted by line 64 the process lag characteristic, denoted by line 66, and in the presence of noise of one quarter of one percent (0.25%). The process gain 64 varied in time k as 1.5+sin(k/7200) and the progress lag 66 varied in time k as 10+10 sin(k/14400). The process dead time was approximated as 2 seconds, the set point changed every 240 seconds, the plot sampling rate was 20 seconds, and the ratio a was chosen to be 1.2. As the graph of FIG. 3 shows, the effects of noise on the adaptation process were minimal and as the controller gain $K_c$ and the controller integral time $T_i$ adapted to the changing controller conditions, the controller gain $K_c$ (line 60) responded inversely to the change in the process gain 64 while the controller integral time $T_i$ (line 62) still exhibited good tracking with the changing progress lag 66. Specifically, the product of the controller gain $K_c$ and the process gain, was plotted as (process gain)*$K_c$+5, denoted by line 68, and illustrates a stable inverse relationship between the controller gain $K_c$ (line 60) and the process gain 64, despite the presence of noise.

Figure 4:
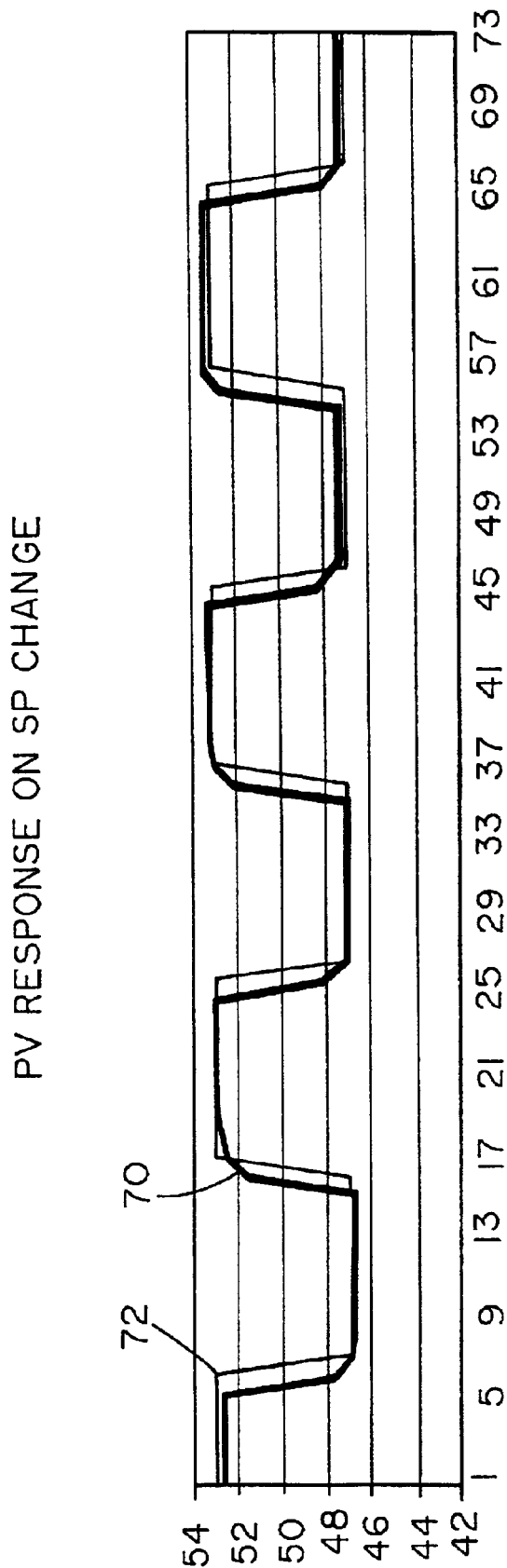
FIG. 4 is a graph plotting process variable change in response to a set point change using the adaptive PID process control system of FIG. 1.

FIG. 4 illustrates a graph plotting the process variable PV, marked by reference 70, adapted in a simulated process control system as described above, in response to a changing set point SP, marked by reference 72. In the illustrated graph, the preset value $W_{ref}$ was chosen to be −0.5, and the ratio α was chosen to be 1.6. It should be noted that the apparent early response of the adaptation of the process variable 70 in response to the changing set point SP is a result of the limitation of the data historian used to retrieve the data plotted. As the graph of FIG. 4 shows, the change in the process variable 70 exhibited very good tracking of the change in the set point 72.

While the adaptive PID control system 10 described herein adapts the controller integral time parameter $T_i$ to force the ratio of the controller proportional term and the controller controller integral time to a particular value, similar equations could be used, as one skilled in the art would now understand, to adapt the derivative time $T_d$ to cause the ratio of the proportional controller term and the derivative controller term to a particular value. Similarly, both of these sets of equations could be used to adapt $T_i$ and $T_d$ to cause ratios of the derivative and integral controller terms to a particular value. Alternatively, after adapting controller integral time, derivative time may be calculated as: $T_d = \alpha_c * T_i$, wherein $\alpha_c$ is a constant in the range of ¼ to ⅛, for example ⅙.₂₅.

Furthermore, in an alternative embodiment, the reset/rate adaptation block 22 adapts the controller integral time and or the derivative time by utilizing the difference of two of the controller terms. For example, the adaptive PID control system 10 could adapt the controller integral time $T_i$ by utilizing the difference of the proportional term and the controller integral time. Specifically, the controller integral time may be calculated as:

$$|\Delta P| - |\Delta I|\alpha = \Sigma \Delta \quad (23)$$

wherein:
ΔP=the change in the controller proportional term;
ΔI=the change in the controller controller integral time;
α=a preset ratio; and wherein:

$$\Delta = |\Delta e(k)| - |e(k)|\frac{\alpha T_s}{T} \quad (24)$$

rewriting the above equation as:

$$\sum \left(|\Delta e(k)| - |e(k)|\frac{\alpha T_s}{T_i}\right) = \sum \Delta \quad (25)$$

or:

$$\Sigma|\Delta e(k)|T_i - \Sigma|e(k)|\alpha T_s = T_i \Sigma \Delta \quad (26)$$

wherein:
e(k)=the error signal, the difference between the set point SP and the process variable PV, at time k;
$T_s$=the scan time interval;
$T_i$=the reset, or the controller integral time;
Δe(k)=the change in the error signal at time k.
By recognizing that the ultimate adaptation goal is to drive Δ to zero, it may be stated that:

$$\Sigma|\Delta e(k)|T'_i - \Sigma|e(k)|\alpha T_s = 0 \quad (27)$$

wherein:
$T'_i = T_i + \Delta T_i$
Combining the above equations, the change in controller integral time $\Delta T_i$ may be ultimately calculated as:

$$\Sigma|\Delta e(k)|\Delta T_i = -T_i \Sigma \Delta \quad (28)$$

or $$\Delta T_i = -\frac{T_i \sum \Delta}{\sum |\Delta e(k)|} \quad (29)$$

Figure 5:
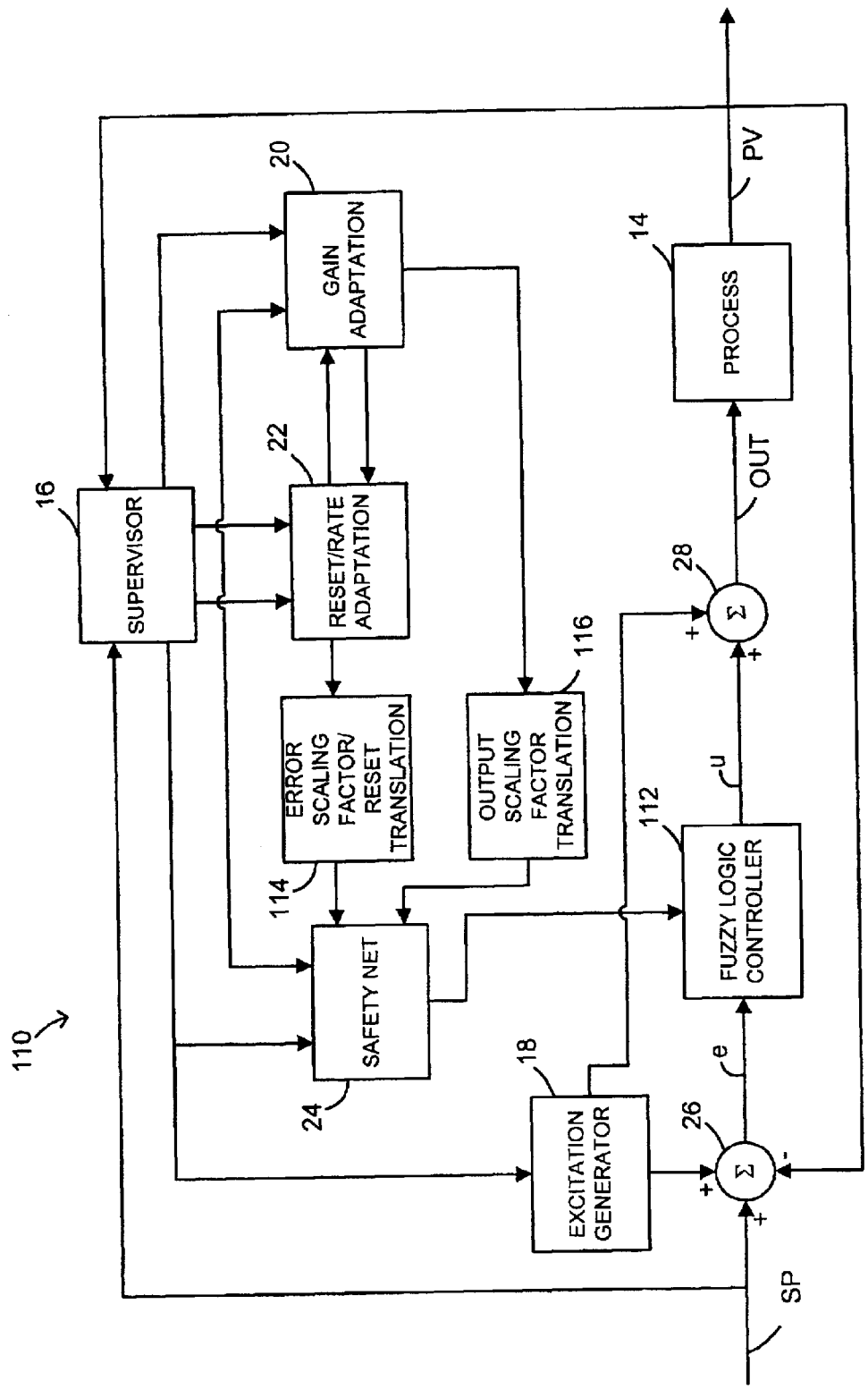
FIG. 5 is a block diagram of a model-free adaptive fuzzy logic process control system.

In another embodiment shown in FIG. 5, the above described adaptation approach may be further applied to an adaptive fuzzy logic controller (FLC) system which is designated generally by the reference character 110. The adaptive FLC system 110 generally utilizes the same components as the adaptive PID control system 10 illustrated in FIG. 1 except that in the adaptive FLC system 110, the process controller 12 is replaced by a fuzzy logic controller 112, and the FLC system 110 includes an additional error scaling factor/reset adaptation translation block 114 and a output scaling factor adaptation translation block 116.

The adaptive FLC system 110 operates according to the same closed-loop operations described above in connection with the adaptive PID control system 10. Specifically, the process variable PV is sensed from the process 14 and is applied to the summing block 26 for comparison with the set point SP and the output signal from the excitation generator 18 may also be applied to the summing block 26 as described above. The error signal e is then delivered to the fuzzy logic controller (FLC) 112. Meanwhile, the supervisor 16, the gain adaptation block 20 and the reset/rate adaptation block 22 operate in accordance with equations (2) through (17) described above. The error scaling factor/reset adaptation translation block 114 and the output scaling factor adaptation translation block 116 translate the computed results from the reset/rate adaptation block 22 and the gain adaptation block 20 into fuzzy logic scaling factors as detailed below.

The FLC 112, operates by using predefined fuzzy rules, membership functions, and adjustable scaling factors. The FLC 112 translates physical values associated with a process control loop into fuzzy logic values by utilizing an error scaling factor $S_e$, a change in error scaling factor $S_{\Delta e}$ and calculating a degree of membership in each of a predefined membership function. Fuzzy logic values of the control input are used then to develop fuzzy logic value of the control output by applying inference rules In one embodiment, the FLC 112 may use the following table during this inference process.

| Number | Rule |
| --- | --- |
| Rule 1 | If error e is NEGATIVE and change in error Δe is NEGATIVE, make change in output Δu POSITIVE. |
| Rule 2 | If error e is NEGATIVE and change in error Δe is POSITIVE, make change in output Δu ZERO. |
| Rule 3 | If error e is POSITIVE and change in error Δe is NEGATIVE, make change in output Δu ZERO. |
| Rule 4 | If error e is POSITIVE and change in error Δe is POSITIVE, make change in output Δu NEGATIVE. |

According to this table, the FLC 112 uses two membership function values for each of the error e and the change in error Δe on the control input developes and three singleton values for the change in output Δu. The two membership function values for each of the error e and the change in error Δe are negative and positive. The three singleton values for change in output Δu are negative, zero, and positive. Fuzzy logic control nonlinearity results from a translation of process variables PV to a fuzzy set (fuzzification), inference rules, and translation of the fuzzy set to a continuous signal (defuzzification).

The fuzzy logic scaling factors are related to the controller gain $K_c$, and the reset $T_i$ or the rate $T_d$ used in a typical proportional-integral-derivative (PID) controller. Specifically, similar to the adaptive PID control system 10 described above, the adaptive FLC system 110 adapts the controller gain $K_c$, and the reset $T_i$ or the rate $T_d$ in accordance with the model free adaptive equations detailed above.

The output scaling factor adaptation translation block 116 may then use the controller gain $K_c$ computed in the gain adaptation block 20 according to the following known equations:

$$S_{\Delta u} = X S_{\Delta e} K_c \qquad (30)$$

wherein:

$S_{\Delta u}$=the change in controller output scaling factor;

X=a preset constant which may be, for example, between the values of 2 and 4;

$S_{\Delta e}$=the change in error scaling factor; and $K_c$=the controller gain and:

$$S_{\Delta e} = \beta_{sf} \Delta SP \qquad (31)$$

wherein:

ΔSP=The set point change relative to a nominal change, for example 1%

$\beta_{sf}$ may be, for example, calculated as:

$$\beta_{sf} = .2 + \frac{D}{T_c} \qquad (32)$$

wherein:

D=the process dead time; and $T_c$=a process lag.

Meanwhile, the error scaling factor/reset adaptation translation block 114 may use the controller integral time $T_i$ computed in the reset/rate adaptation block 22 according to the following equation:

$$S_e = \frac{T_i S_{\Delta e}}{\Delta t} \qquad (33)$$

wherein:

$S_e$=the error scaling factor;

$T_i$=the controller integral time;

$S_{\Delta e}$=the change in error scaling factor; and

Δt=the controller scan period.

As in the adaptive PID control system 10, in the present embodiment, the adaptive FLC system 110 may also be equipped with the safety net 24 to prevent oscillation of the process variable PV. Specifically, the supervisor 16 may activate the safety net 24 to reduce the change in controller output scaling factor $S_{\Delta u}$. To effect the reduction in the controller gain, the safety net 24 may utilize the following equation:

$$S_{\Delta u}(k+1) = \eta S_{\Delta u}(k) \qquad (34)$$

wherein:

η=a preset proportional constant which may be, for example, 0.95; and $S_{\Delta u}$=the change in output scaling factor.

Figure 6:
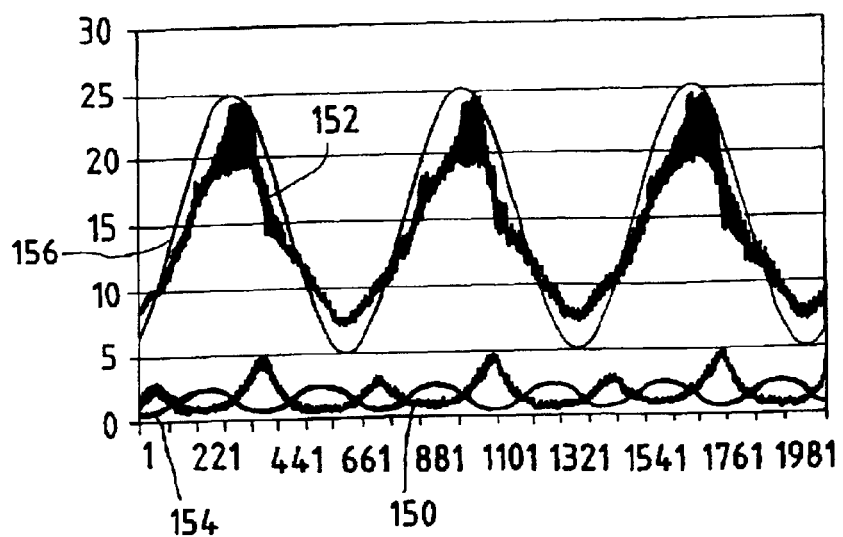
FIG. 6 is a graph plotting a change in controller output scaling factor and an error scaling factor adaptation, in response to changing process parameters in the system of FIG. 5.

FIG. 6 illustrates a graph plotting both the change in controller output scaling factor $S_{\Delta u}$, marked by reference 150, and the error scaling factor $S_e$, marked by reference 152, versus time, wherein the change in controller output scaling factor $S_{\Delta u}$ and the error scaling factor $S_e$ were adapted in a simulated fuzzy logic process control system as described above, in response to changes in the process gain characteristic, denoted by line 154 and the process lag characteristic, denoted by line 156. Specifically, the process gain 154 varied in time k as 1.5+sin(k/7200) and the process lag 156 varied in time k as 15+10*sin(k/14400). The process dead time was approximated as 2 seconds, the set point changed every 120 seconds, the plot sampling rate was 10 seconds, and the ratio α was chosen to be 1.2. As the graph of FIG. 6 shows, as the change in controller output scaling factor $S_{\Delta u}$ and the error scaling factor $S_e$ adapted to the changing controller conditions, the change in controller output scaling factor $S_{\Delta u}$ (line 150) responded inversely to the change in the process gain 154 while the error scaling factor $S_e$ (line 152), which was plotted as $S_e*5$, exhibited good tracking with the changing process lag 156.

Figure 7:
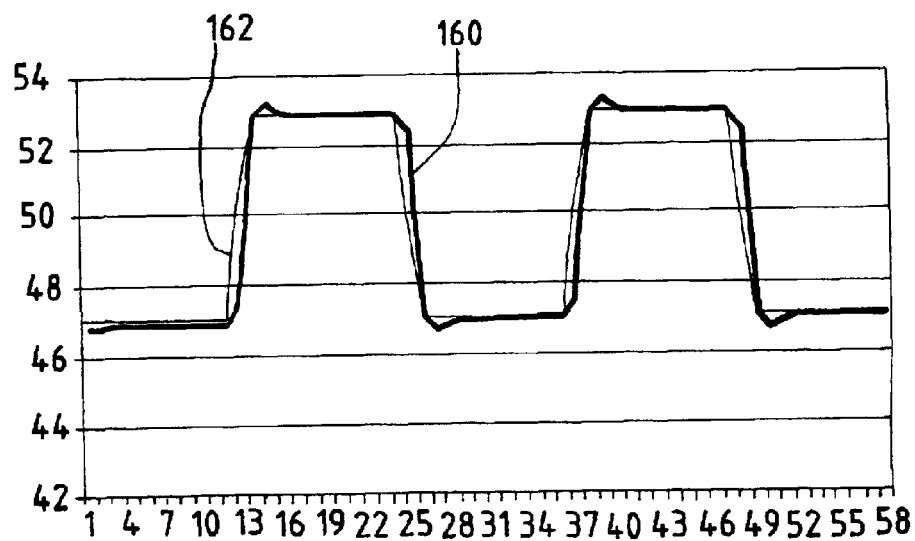
FIG. 7 is a graph plotting process variable change in response to a set point change as a result of the adaptations illustrated in FIG. 6.

FIG. 7 illustrates a graph plotting the process variable PV, marked by reference 160, adapted in the same simulated fuzzy logic process control system 110 as illustrated in FIG. 6, in response to a changing set point SP, marked by reference 162. As the graph of FIG. 7 shows, the change in the process variable 160 exhibited very good tracking of the change in the set point 162.

Figure 8:
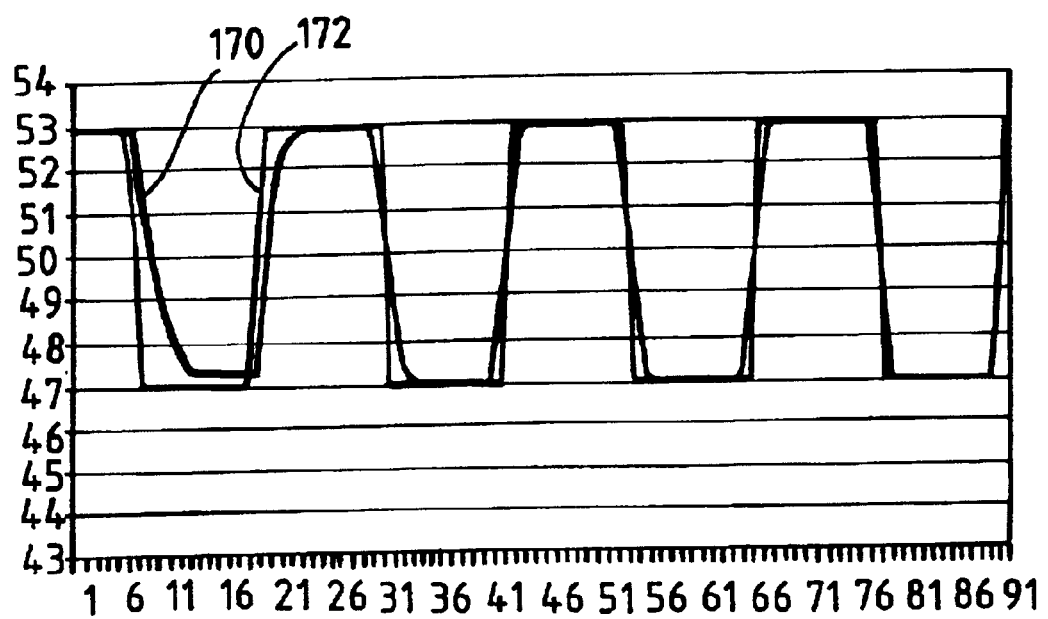
FIG. 8 is a graph plotting process variable change in response to a set point change using the adaptive fuzzy logic process control system of FIG. 5.

FIG. 8 illustrates a graph plotting the process variable PV, marked by reference 170, adapted in another simulated fuzzy logic process control system using the principles described herein, in response to a changing set point SP, marked by reference 172. In the simulated process control system, the process gain was 1.5, the change in controller output scaling factor $S_{\Delta u}$ was 1.0, the process dead time was 2 seconds, the plot sampling rate was 10 seconds, the process lag was changed from 15 seconds to 5 seconds, the set point changed +/−6% every 120 seconds, the value of α was chosen to be 1.2 and value of λ was chosen to be 0.2. The process adaptation was initiated after the seventeenth sample. As the graph of FIG. 8 shows, after adaptation was initiated, the change in the process variable PV (line 170) exhibited very good tracking of the change in the set point SP (line 172).

While the adaptive PID control system 10 of FIG. 1 and the adaptive FLC system 110 of FIG. 5 are illustrated in a block diagram format, it will be understood that the supervisor 16, the gain adaptation block 20, the reset/rate adaptation block 22, the safety net 24, the scaling factor error/rate translation block 114 and the scaling factor output translation block 116 may be implemented in separate or common hardware, software in memory and run on a processor, or in firmware. These components may be implemented on the same device or processor or in different devices or processors as desired and may be programmed using any desired programming language. Furthermore, these components may be implemented within a controller, such as the controller 12, in the excitation generator 18 or any other device. Likewise, the excitation generator 18 may be any desired type of signal generator, such as a square wave generator, a sinusoidal wave generator, etc. and may be digital or analog in nature.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A tuner for use in tuning a process controller which uses a set point and a process variable to generate a process control signal, the tuner comprising:
 a first module which develops an error signal representative of the difference between the set point and the process variable;
 a gain adaptation module which uses the error signal to develop a gain for use in tuning the process controller, wherein the gain adaptation module calculates the gain as a combination of an oscillation index gain and of a gain calculated from a process steady state gain; and
 a second module which monitors the process variable to detect when the process variable oscillates, and upon detection of the process variable oscillating, modifies the gain to prevent the process variable from oscillating.

2. The tuner of claim 1, wherein the first module further causes the gain adaptation module to develop the gain when the error signal is greater than a predetermined threshold.

3. The tuner of claim 2, further comprising an excitation generator which produces an excitation signal and a summer which sums the error signal with the excitation signal to cause the error signal to be greater than the predetermined threshold.

4. The tuner of claim 1, wherein the second module detects when the process variable oscillates by detecting when the error signal crosses a zero point.

5. The tuner of claim 1, wherein the second module modifies the gain to prevent the process variable from oscillating by multiplying the gain by a dampening constant.

6. The tuner of claim 5, wherein the dampening constant is a positive constant less than one.

7. The tuner of claim 1, wherein the gain adaptation module further develops one of a proportional-integral-derivative (PID) controller gain, a proportional-integral (PI) controller gain, or a proportional-derivative (PD) controller gain.

8. The tuner of claim 1, wherein the gain adaptation module computes the gain as a weighted summation of the gain calculated from the oscillation index gain and of the gain calculated from the process steady state gain.

9. The tuner of claim 1, wherein the process controller is a fuzzy logic controller and further comprising a translation module which uses the gain developed by the gain adaptation module to develop a change in controller output scaling factor for use in tuning the fuzzy logic controller.

10. The tuner of claim 9, further comprising a second module which monitors the process variable to detect when the process variable oscillates, and upon the detection of the process variable oscillating, modifies the change in controller output scaling factor to prevent the process variable from oscillating.

11. The tuner of claim 10, wherein the second module detects when the process variable oscillates by detecting when the error signal crosses a zero point.

12. The tuner of claim 10, wherein the second module modifies the change in controller output scaling factor term to prevent the process variable from oscillating by multiplying the change in controller output scaling factor term by a dampening constant.

13. The tuner of claim 12, wherein the dampening constant is a positive constant less than one.

14. The tuner of claim 9, wherein the translation module calculates the change in controller output scaling factor as:

$$S_{\Delta u} = X S_{\Delta e} K_c$$

wherein:
 $S_{\Delta u}$=the change in controller output scaling factor;
 X=a preset constant between the values of 2 and 4;
 $S_{\Delta e}$=a change in error scaling factor;
 $K_c$=a gain for use in tuning the process controller;
wherein:

$$S_{\Delta u} = \beta_{sf} \Delta SP$$

wherein:
 ΔSP=a change in the set point relative to a nominal set point 1% change;
 $\beta_{sf}$=a determined value.

15. The tuner of claim 14, wherein the translation module calculates the determined value ($\beta_{sf}$) as:

$$\beta_{sf} = .2 + \frac{D}{T_c}$$

wherein:
 D=a process dead time; and
 $T_c$=a process lag.

16. A tuner for use in tuning a process controller which set a set point and a process variable to generate a process control signal, the tuner comprising:
 a first module which develops an error signal representative of the difference between the set point and the process variable;
 a gain adaptation module which uses the error signal to develop a gain for use in tuning the process con controller, wherein the gain adaptation module calculates the gain as a combination of oscillation index gain and of a gain calculated from a process steady state gain; and a second module which monitors the process variable to detect when the process variable oscillates, and upon detection of the process variable oscillating, modifies the gain to prevent the process variable from oscillating;

wherein the gain adaptation module computes the controller gain from the process steady state gain as $$K_c^{SS} = \frac{|OUT^0 - OUT^1|}{|PV^0 - PV^1|\lambda\left(1 + \frac{DT}{T_i(k)}\right)}$$

wherein:
$K_c^{SS}$=the gain calculated from the process steady state gain;
$PV^0$=the process variable before a change in the set point;
$OUT^0$=a controller output before the change in the set point;
$PV^1$=a steady state process variable after the change in the set point;
$OUT^1$=a steady state controller output after the change in the set point;
$\lambda$=a lambda controller tuning factor;
DT=a process deed time; and
$T_i(k)$=a controller reset at a time k.

17. A tuner for use in tuning a process controller which uses a set point and a process variable to generate a process control signal, the tuner comprising:
a first module which develops an error signal representative of the difference between the set point an the process variable;
a gain adaptation module which uses the error signal to develop a gain for use in tuning the process controller, wherein the gain adaptation module calculates the gain as a combination of an oscillation index gain and of a gain calculated from a process steady state gain; and
a second module which monitors the process variable to detect when the process variable oscillate, and upon detection of the process variable oscillating, modifies the gain to prevent the process variable from oscillating;
wherein the gain adaptation module computes the controller gain from the oscillation index as $$K_c^{OSC} = K_c^{OSC}(k) + \Delta K_c^{OSC}(k)$$

wherein:
$K_c^{OSC}(k)$=the gain calculated from the oscillation index at a time k;
$K_c^{OSC}(k-1)$=the gain calculated from the oscillation index at a time k-1;
$\Delta K_c^{OSC}(k)$=a change in the gain calculated from the oscillation index at a time k;
wherein:

$$\Delta K_c^{OSC}(k) = \chi K_c^{OSC}(k)(W(k) + W_{ref})$$

wherein:
$\chi$=a predetermined constant between the values of 0.02 and 0.05;
$W_{ref}$=a preset value chosen from the interval −1 to +1;
W(k)=an oscillation index at a time k;

wherein:

$$W(k) = \text{sign}[e(k)]\text{sign}\left[\frac{e(k) + e(k-2i)}{2} - e(k-i)\right]$$

wherein:
i=int((k−$k_0$)/2);
$k_o$=a time at which adaptation started; and
e(k)=the error signal at a time k.

18. The tuner of claim 17, wherein the gain adaptation module further reduces the effect of noise by changing the preset value $W_{ref}$ by a determined value dependent upon the noise level.

19. A tuner for use in tuning a process controller which uses a set point and a process variable to generate a process control signal, the tuner comprising:
a first module which develops an error signal representative of the difference between the set point and the process variable;
an adaptation module which uses the error signal to calculate at least two of a proportional term, a controller integral time, and a derivative term for use in tuning the process controller, wherein the adaptation module calculates a first and a second of the proportional, integral and derivative terms so that a ratio of a change in the first term and of a change in the second term is equal to a preset constant; and
a second module which monitors the process variable to detect when the process variable oscillates, and upon detection of the process variable oscillating, modifies at least one of the proportional term, the controller integral time, and the derivative term to prevent the process variable from oscillating.

20. The tuner of claim 19, wherein the first module further causes the adaptation module to calculate the first term and the second term when the error signal is greater than a predetermined threshold.

21. The tuner of claim 20, further comprising an excitation generator which produces an excitation signal and a summer which sums the error signal with the excitation signal.

22. The tuner of claim 19, wherein the adaptation module uses the preset constant such that the product of the preset constant and a lambda-tuning constant is equal to approximately one.

23. The tuner of claim 19, wherein the adaptation module uses the preset constant such that the product of the preset constant and a lambda-tuning constant is greater than one.

24. The tuner of claim 19, wherein the adaptation module uses the preset constant such that the product of the preset constant and a lambda-tuning constant is less than one.

25. The tuner of claim 19, wherein the second module further detects when the process variable oscillates by detecting when the error signal crosses a zero point.

26. The tuner of claim 19, wherein the second module modifies the at least one of the proportional term, the controller integral time, and the derivative term to prevent the process variable from oscillating by multiplying the at least one of the proportional term, the controller integral time, and the derivative term by a dampening constant.

27. The tuner of claim 26, wherein the dampening constant is a positive constant less than one.

28. The tuner of claim 19, wherein the process controller is a fuzzy logic controller and further comprising a translation module which uses the first and second of the terms calculated by the adaptation module to develop an error scaling factor for use in tuning the fuzzy logic controller.

29. The tuner of claim 28, wherein the translation module calculates the error scaling factor as $$S_e = \frac{T_i S_{\Delta e}}{\Delta t}$$

wherein:
$S_e$=the error scaling factor;
$T_i$=the controller integral time;
$S_{\Delta e}$=a change in error scaling factor; and
$\Delta t$=a controller scan period.

30. A tuner for use in tuning a process controller which set a set point and a profess variable to generate a process control signal, the tuner comprising:
  a first module which develops an error signal representative of the difference between the set point and the process variable;
  an adaptation module which uses the error signal to calculate at least two of a proportional term, an controller integral the and a derivative term for use in tuning the process controller, wherein the adaptation module calculates a first and a second of the proportional, integral and derivative terms so that a ratio of a change in the first term and of a change in the second term is equal to a preset constant; and
  a second module which monitors the process variable to detect when the process variable oscillates, and upon detection of the process variable oscillating, modifies at least one of the proportional term, the controller integral time, and the derivative term to prevent the process variable from oscillating;
  wherein the adaptation module calculates the controller integral time as:

$$T_i(k+1) = T_i(k) + \Delta T_i(k)$$

wherein:
$T_i(k+1)$=an controller integral time at a time k+1;
$T_i(k)$=the controller integral time at the time k;
$\Delta T_i(k)$=a change in the controller integral time at the time k;
wherein:

$$\Delta T_i(k) = \gamma T_i(k)\left(\frac{1}{\beta} - 1\right)$$

wherein:
$\gamma$=a preset constant controlling the speed of reset adaptation which may be, for example, between 0.05 and 0.5; and $$\beta = \frac{|\Delta P_k|}{\alpha|\Delta I_k|} = \frac{|\Delta e(k)|T_i(k)}{\alpha|e(k)|T_s}$$

wherein:
$\Delta P_k$=the change in the proportional term at the time k;
$\Delta I_k$=the change in the controller integral time at the time k; and
$\alpha$=a preset ratio.

31. A tuner for use in tuning a process controller which uses a set point and a process variable to generate a process control signal, the tuner comprising:
  a first module which develops an error signal representative of the difference between the set point and the process variable;
  a gain adaptation module which uses the error signal to develop a gain for use in tuning the process controller, wherein the gain adaptation module calculates the gain as a combination of an oscillation index gain and of a gain calculated from a process steady state gain; and
  an adaptation module which uses the error signal to calculate at least two of a proportional term, an controller integral time, and a derivative term for use in tuning the process controller, wherein the adaptation module calculates a first and a second of the proportional, integral, and derivative terms so that a ratio of a change in the first term and of a change in the second term is equal to a preset constant.

32. The tuner of claim 31, wherein the first module further causes the gain adaptation module to develop the gain and to cause the adaptation module to calculate the first term and the second term when the error signal is greater than a predetermined threshold.

33. The tuner of claim 32, further comprising an excitation generator which produces an excitation signal and a summer which sums the error signal with the excitation signal.

34. The tuner of claim 31, wherein the adaptation module compensates the controller integral time when the product of the change in the controller gain and the controller integral time is greater than zero.

35. A tuner for use in tuning a process controller which uses a set point and a process variable to generate a process control signal, the tuner comprising:
  a first module which develops an error signal representative of the difference between the set point and the process variable;
  a gain adaptation module which uses the error signal to develop a gain for use in tuning the process controller, wherein the gain adaptation module calculates the gain as a combination of an oscillation index gain and of a gain calculated from a process steady state gain; and
  an adaptation module which uses the error signal to calculate at least two of a proportional term, an controller integral time, and derivative term for use in tuning the process controller, wherein the adaptation module calculates a first and a second of the proportional integral, and derivative terms that a ratio of a change in the first term and of a change in the second term is equal to a preset constant;
  wherein the adaptation module compensates the controller integral time when the product of the chance in the controller gain and the controller integral time is greater than zero; and
  wherein the adaptation block compensates the controller integral time as:

$$\Delta T_i(k)_{corr} = \Delta T_i(k)\left(1 - \kappa \frac{|\Delta K_c(k)|}{(K_c(k))_{old}}\right)$$

wherein
$\Delta T_i(k)_{corr}$=a compensated change in the controller integral time at a time k;
$\Delta T_i(k)$=a change in the controller integral time at a time k;
$\Delta K_c(k)$=a change in the gain at the time k;

$K_c(k)_{old}$=the gain at the time k before the adaptation module compensates; and κ=a degree of reset compensation.

36. A method of tuning a process controller which uses a set point and a process variable to generate a process control signal, the method comprising the steps of:

developing an error signal representative of the difference between the set point and the process variable; and calculating at least two of a proportional term, an controller integral time, and a derivative term for use in tuning the process controller, wherein a ratio of a change in first term and of a change in the second term is equal to a preset constant.

37. The method of claim 36, further comprising the step of calculating at least two of the proportional term, the controller integral time, and the derivative term when the error signal is greater than a predetermined threshold.

38. The method of claim 37, further comprising the steps of introducing an excitation signal and summing the error signal with the excitation signal.

39. The method of claim 36, further comprising the step of monitoring the process variable to detect when the process variable oscillates, and upon detection of the process variable oscillating, modifying at least one of the proportional term, the controller integral time, and the derivative term to prevent the error signal from oscillating.

40. The method of claim 36, further comprising the step of developing a gain for use in tuning the process controller, wherein the gain is a combination of an oscillation index gain and of a gain calculated from a process steady state gain.

41. A tuning system for tuning a process controller which uses a set point and a process variable to generate a process control signal, the tuning system comprising:

a memory;

a first logic routine stored in the memory and executed on a processor to S develop an error signal representative of the difference between the set point and the process variable; and a second logic routine stored in the memory and executed on a processor to develop a gain for use in tuning the process controller, wherein the gain is a combination of a gain calculated from an oscillation index gain and of a gain calculated from a process steady state gain.

42. The tuning system of claim 41, further comprising a third logic routine stored in the memory and executed on a processor to develop the gain when the error signal is greater than a predetermined threshold.

43. The tuning system of claim 41, further comprising a third logic routine stored in the memory and executed on a processor to calculate at least two of a proportional term, an controller integral time, and a derivative term for use in tuning the process controller, wherein a ratio of a change in the first term and of a change in the second term is equal to a preset constant.

44. The tuning system of claim 43, further comprising a fourth logic routine stored in the memory and executed on a processor to develop the gain when the error signal is greater than a predetermined threshold.

45. The tuning system of claim 43, further comprising a fourth logic routine stored in the memory and executed on a processor to monitor the process variable to detect when the process variable oscillates, and upon detection of the process variable oscillating, to modify the gain to prevent the process variable from oscillating.

46. A process control system comprising:

a process controller which uses a set point and a process variable to generate a process control signal;

a tuner for tuning the process controller;

a first module which develops an error signal representative of the difference between the set point and the process variable; and a gain adaptation module which uses the error signal to develop a gain for use in tuning the process controller, wherein the gain adaptation module calculates the gain as a combination of a gain calculated from an oscillation index gain and of a gain calculated from a process steady state gain.

47. The process control system of claim 46, wherein the first module further causes the gain adaptation module to develop the gain when the error signal is greater than a predetermined threshold.

48. The process control system of claim 46, further comprising a second module which monitors the process variable to detect when the process variable oscillates, and upon detection of the process variable oscillating, modifies the gain to prevent the process variable from oscillating.

49. The process control system of claim 48, wherein the second module modifies the gain to prevent the process variable from oscillating by multiplying the gain by a dampening constant.

50. The process control system of claim 48, further comprising an adaptation module which uses the error signal to calculate at least two of a proportional term, an controller integral time, and a derivative term for use in tuning the process controller, wherein the adaptation module calculates a first and a second of the proportional, integral, and derivative terms so that a ratio of a change in first term and of a change in the second term is equal to a preset constant.

* * * * *

UNITED STATES PATENT AND TRADEMARK OFFICE
CERTIFICATE OF CORRECTION

| | | |
|---|---|---|
| PATENT NO. | : 6,970,750 B2 | Page 1 of 1 |
| APPLICATION NO. | : 10/126768 | |
| DATED | : November 29, 2005 | |
| INVENTOR(S) | : Wilhelm K. Wojsznis et al. | |

It is certified that error appears in the above-identified patent and that said Letters Patent is hereby corrected as shown below:

At Column 6, line 32, please delete "and or" and insert --and/or--
At Column 7, line 17, please delete "yP$_k$" and insert --$\Delta P_k$--
At Column 8, line 60, please delete "a" and insert --$\alpha$--
At Column 9, line 53, please delete "and or" and insert --and/or--
At Column 10, line 28, please delete "$\Sigma|\Delta e(k)\Delta T_1$" and insert --$\Sigma|\Delta e(k)|\Delta T_1$--
At Column 11, line 24, please delete "develops" and insert --develops--

In Claim 9, Column 14, line 59, please delete "set" and insert --uses--
In Claim 9, Column 14, line 59, please delete "con"
In Claim 10, Column 15, line 36, please delete "an" and insert --and--
In Claim 10, Column 15, line 44, please delete "oscillate" and insert --oscillates--
In Claim 10, Column 15, line 67, please delete "a an" and insert --an--
In Claim 28, Column 17, line 15, please delete "set" and insert --uses--
In Claim 28, Column 17, line 16, please delete "profess" and insert --process--
In Claim 28, Column 17, line 22, please delete "an" and insert --a--
In Claim 28, Column 17, line 23, please delete "time the" and Insert --time,--
In Claim 29, Column 17, line 41, please delete "an" and insert --a--
In Claim 31, Column 18, line 10, please delete "an" and insert --a--
In Claim 35, Column 18, line 43, please delete "an" and insert --a--
In Claim 35, Column 18, line 51, please delete "chance" and insert --change--
In Claim 36, Column 19, line 9-10, please delete "an" and insert --a--
In Claim 36, Column 19, line 12, please insert --the-- immediately before "first"
In Claim 41, Column 41, line 36, please delete "S"
In Claim 43, Column 20, line 1-2, please delete "an" and insert --a--
In Claim 50, Column 20, line 44-45, please delete "an" and insert --a--

Signed and Sealed this

Twenty-ninth Day of May, 2007

JON W. DUDAS
*Director of the United States Patent and Trademark Office*